United States Patent
Zhang (10) Patent No.: US 10,454,288 B2
(45) Date of Patent: Oct. 22, 2019

(54) QUICK CHARGING METHOD, POWER ADAPTER AND MOBILE TERMINAL

(71) Applicant: Guangdong Oppo Mobile Telecommunications Corp., Ltd., Dongguan, Guangdong (CN)

(72) Inventor: Jialiang Zhang, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 241 days.

(21) Appl. No.: 15/405,771

(22) Filed: Jan. 13, 2017

(65) Prior Publication Data

US 2017/0149252 A1    May 25, 2017

Related U.S. Application Data (63) Continuation of application No. PCT/CN2015/078905, filed on May 13, 2015.

(30) Foreign Application Priority Data

Nov. 11, 2014  (WO) ................ PCT/CN2014/090847
Mar. 11, 2015  (WO) ................ PCT/CN2015/074050

(51) Int. Cl.
*H02J 7/00*       (2006.01)
*G06F 1/20*       (2006.01)
(Continued)

(52) U.S. Cl.
CPC ............ *H02J 7/0044* (2013.01); *G06F 1/206* (2013.01); *G06F 1/26* (2013.01); *H02J 7/007* (2013.01);
(Continued)

(58) Field of Classification Search
CPC .................................................... H02J 7/0044
(Continued)

(56) References Cited

U.S. PATENT DOCUMENTS 5,764,035 A    6/1998  Lee
6,577,105 B1   6/2003  Iwaizono
(Continued)

FOREIGN PATENT DOCUMENTS

CN    101355259 A    1/2009
CN    101399386 A    4/2009
(Continued)

OTHER PUBLICATIONS

Extended European search report issued in corresponding European application No. 15859023.2 dated Dec. 15, 2017.

*Primary Examiner* — Richard V Muralidar
(74) *Attorney, Agent, or Firm* — Young Basile Hanlon & MacFarlane, P.C.

(57) ABSTRACT

A method, a mobile terminal and a power adapter for quick charging includes: sending, by a mobile terminal, a first instruction indicating that the mobile terminal is operable under the quick charging mode to the power adapter through the at least one data line in the USB interface, the first instruction being configured for instructing the power adapter to adjust an output of the power adapter based on the received first instruction; and receiving, by the mobile terminal, a charging current delivered by the at least one power line and corresponding to the quick charging mode from the power adapter, so as to charge a battery in the mobile terminal.

16 Claims, 3 Drawing Sheets

(51) Int. Cl.
*G06F 1/26* (2006.01)
*H02J 7/04* (2006.01)

(52) U.S. Cl.
CPC .......... *H02J 7/0045* (2013.01); *H02J 7/0052* (2013.01); *H02J 7/04* (2013.01); *H02J 2007/0001* (2013.01); *H02J 2007/0062* (2013.01); *H02J 2007/0096* (2013.01)

(58) Field of Classification Search
USPC ................. 320/103, 152, 157–159, 162–164
See application file for complete search history.

(56) References Cited

U.S. PATENT DOCUMENTS

| | | | |
|---|---|---|---|
| 7,190,171 | B2 | 3/2007 | Kawakami et al. |
| 9,356,460 | B2 | 5/2016 | Wong |
| 9,899,854 | B2 | 2/2018 | Wei |
| 2007/0194626 | A1 | 8/2007 | Eager et al. |
| 2009/0027010 | A1 | 1/2009 | Ha et al. |
| 2009/0309547 | A1 | 12/2009 | Nakatsuji |
| 2010/0039081 | A1 | 2/2010 | Sip |
| 2011/0016341 | A1 | 1/2011 | Tom et al. |
| 2011/0221604 | A1 | 9/2011 | Johnson |
| 2012/0146583 | A1 | 6/2012 | Gaul et al. |
| 2012/0153891 | A1 | 6/2012 | Yang et al. |
| 2013/0141034 | A1 | 6/2013 | Huang et al. |
| 2014/0300321 | A1 | 10/2014 | Kim et al. |
| 2015/0035477 | A1* | 2/2015 | Wong .................. H02J 7/0068 320/107 |
| 2015/0256018 | A1* | 9/2015 | Wei .......................... H02J 3/14 455/573 |
| 2016/0064977 | A1 | 3/2016 | Chen et al. |
| 2016/0064978 | A1 | 3/2016 | Lei et al. |
| 2016/0380462 | A1 | 12/2016 | Zhang et al. |

FOREIGN PATENT DOCUMENTS

| | | |
|---|---|---|
| CN | 101771178 A | 7/2010 |
| CN | 102270680 A | 12/2011 |
| CN | 102270860 A | 12/2011 |
| CN | 202268816 U | 6/2012 |
| CN | 102957193 A | 3/2013 |
| CN | 103098338 A | 5/2013 |
| CN | 103730933 A | 4/2014 |
| CN | 103762702 A | 4/2014 |
| CN | 103779907 A | 5/2014 |
| CN | 203617746 U | 5/2014 |
| CN | 203722283 U | 7/2014 |
| CN | 104065126 A | 9/2014 |
| CN | 104065147 A | 9/2014 |
| CN | 104092274 A | 10/2014 |
| CN | 104124483 A | 10/2014 |
| CN | 104135057 A | 11/2014 |
| CN | 104269893 A | 1/2015 |
| EP | 2615714 A1 | 7/2013 |
| EP | 2892214 A2 | 7/2015 |
| EP | 3101766 A1 | 12/2016 |
| JP | 06284586 A | 10/1994 |
| JP | 07-308031 A | 11/1995 |
| JP | 08126221 A | 5/1996 |
| JP | 09181799 A | 7/1997 |
| JP | 2007141164 A | 6/2007 |
| JP | 2007189789 A | 7/2007 |
| JP | 2007-528186 A | 10/2007 |
| JP | 2008249713 A | 10/2008 |
| JP | 2010522527 A | 7/2010 |
| JP | 2011234355 A | 11/2011 |
| JP | 2012143092 A | 7/2012 |
| JP | 2012191783 A | 10/2012 |
| JP | 2012223077 A | 11/2012 |
| JP | 2013198262 A | 9/2013 |
| JP | 2014003896 A | 1/2014 |
| JP | 2014-158407 A | 8/2014 |
| JP | 2017505101 A | 2/2017 |
| JP | 2017507636 A | 3/2017 |
| KR | 101011922 B1 | 2/2011 |
| WO | 2010084599 A1 | 7/2010 |
| WO | 2012167677 A1 | 12/2012 |
| WO | 2013167076 A2 | 11/2013 |
| WO | 2013178191 A2 | 12/2013 |
| WO | 2014075498 A1 | 5/2014 |
| WO | 2014077978 A1 | 5/2014 |
| WO | 2014097640 A1 | 6/2014 |
| WO | 2014187415 A1 | 11/2014 |

* cited by examiner

QUICK CHARGING METHOD, POWER ADAPTER AND MOBILE TERMINAL

CROSS-REFERENCE TO RELATED APPLICATION(S)

This application is a continuation of international Patent Application PCT No. PCT/CN2015/078905 filed on May 13, 2015, which claims priority to international Patent Application PCT No. PCT/CN2014/090847 filed on Nov. 11, 2014 and international Patent Application PCT No. PCT/CN2015/074050 filed on Mar. 11, 2015. The aforementioned patent applications are hereby incorporated by reference in their entireties.

TECHNICAL FIELD

The present disclosure relates to the field of battery charging, and more particularly, to a quick charging method, a power adapter and a mobile terminal using the same.

BACKGROUND

Currently, mobile terminals (such as smart phones) are increasingly favored by consumers. There is a need to frequently recharge the mobile terminals to maintain the power consumption of the mobile terminals. With the increase of the battery capacity of the mobile terminals, it takes more time to fully charge the battery. Accordingly, how to shorten the charging time has been a major concern to be solved.

In related arts, in order to shorten the charging time, it is a common method to directly increase an output current of a power adapter regardless of the capacity of a mobile terminal, such that the mobile terminal may be overloaded to cause overheating or even burning, thereby shortening the life span of the mobile terminal.

SUMMARY

Disclosed herein are implementations of a method for quick charging, wherein the method is executed by a mobile terminal which is configured for coupling with a power adapter via a USB (Universal Serial Bus) interface of the mobile terminal, at least one power line located in the USB interface is configured for delivering electrical power from the power adapter to the mobile terminal to charge the mobile terminal, and at least one data line located in the USB interface is configured for establishing a bi-directional communication between the power adapter and the mobile terminal, the mobile terminal is selectively operable under a first charging mode or a second charging mode, and a charging current delivered by the at least one power line when the mobile terminal is operable under the second charging mode is greater than a charging current delivered by the at least one power line when the mobile terminal is operable under the first charging mode, the method comprises sending, by the mobile terminal, a first instruction indicating that the mobile terminal is operable under the second charging mode to the power adapter through the at least one data line in the USB interface, the first instruction being configured for instructing the power adapter to adjust an output of the power adapter based on the received first instruction, and receiving, by the mobile terminal, a charging current delivered by the at least one power line and corresponding to the second charging mode from the power adapter, so as to charge a battery in the mobile terminal.

Disclosed herein are also implementations of a method for quick charging, wherein the method is executed by a power adapter which is configured for coupling with a mobile terminal via a USB interface of the mobile terminal, at least one power line located in the USB interface is configured for delivering electrical power from the power adapter to the mobile terminal to charge the mobile terminal, and at least one data line located in the USB interface is configured for establishing a bi-directional communication between the power adapter and the mobile terminal, the power adapter is selectively operable under a first charging mode or a second charging mode, and a charging current delivered by the at least one power line when the power adapter is operable under the second charging mode is greater than a charging current delivered by the at least one power line when the power adapter is operable under the first charging mode, the method comprises receiving, by the power adapter, a first instruction indicating that the mobile terminal is operable under the second charging mode and sent by the mobile terminal through the at least one data line in the USB interface, the first instruction being configured for instructing the power adapter to adjust an output of the power adapter based on the received first instruction, and adjusting, by the power adapter, a charging current to a current corresponding to the second charging mode, so as to charge a battery in the mobile terminal.

Disclosed herein are also implementations of a mobile terminal, wherein the mobile terminal is configured for coupling with a power adapter via a USB (Universal Serial Bus) interface of the mobile terminal, at least one power line located in the USB interface is configured for delivering electrical power from the power adapter to the mobile terminal to charge the mobile terminal, and at least one data line located in the USB interface is configured for establishing a bi-directional communication between the power adapter and the mobile terminal, the mobile terminal is selectively operable under a first charging mode or a second charging mode, and a charging current delivered by the at least one power line when the mobile terminal is operable under the second charging mode is greater than a charging current delivered by the at least one power line when the mobile terminal is operable under the first charging mode, the mobile terminal comprises a communication unit configured for sending a first instruction indicating that the mobile terminal is operable under the second charging mode to the power adapter through the at least one data line in the USB interface, the first instruction being configured for instructing the power adapter to adjust an output of the power adapter based on the received first instruction, and a charging unit configured for receiving a charging current delivered by the at least one power line and corresponding to the second charging mode from the power adapter, so as to charge a battery in the mobile terminal.

Disclosed herein are also implementations of power adapter, wherein the power adapter is configured for coupling with a mobile terminal via a USB interface of the mobile terminal, at least one power line located in the USB interface is configured for delivering electrical power from the power adapter to the mobile terminal to charge the mobile terminal, and at least one data line located in the USB interface is configured for establishing a bi-directional communication between the power adapter and the mobile terminal, the power adapter is selectively operable under a first charging mode or a second charging mode, and a charging current delivered by the at least one power line when the power adapter is operable under the second charging mode is greater than a charging current delivered by the at least one power line when the power adapter is operable under the first charging mode, the power adapter comprises a communication unit configured for receiving a first instruction indicating that the mobile terminal is operable under the second charging mode and sent by the mobile terminal through the at least one data line in the USB interface, the first instruction being configured for instructing the power adapter to adjust an output of the power adapter based on the received first instruction, and a current adjusting unit configured for adjusting a charging current to a current corresponding to the second charging mode, so as to charge a battery in the mobile terminal.

BRIEF DESCRIPTION OF THE DRAWINGS

In order to more clearly illustrate technical solutions according to implementations of the present disclosure, accompanying drawings used for the implementations of the present disclosure will be briefly introduced hereinafter. Apparently, the accompanying drawings described below merely show some implementations of the present disclosure, and persons skilled in the art may derive other drawings from these accompanying drawings without creative efforts.

DETAILED DESCRIPTION

In conjunction with the drawings in the implementations of the present disclosure, a clear, complete description for the technical solutions in the implementations of the present disclosure is provided below. Apparently, the described implementations are a part rather than all of the implementations of the present disclosure. All other implementations derived by persons skilled in the art from the implementations of the present disclosure without creative efforts should fall within the protection scope of the present disclosure.

Figure 1:
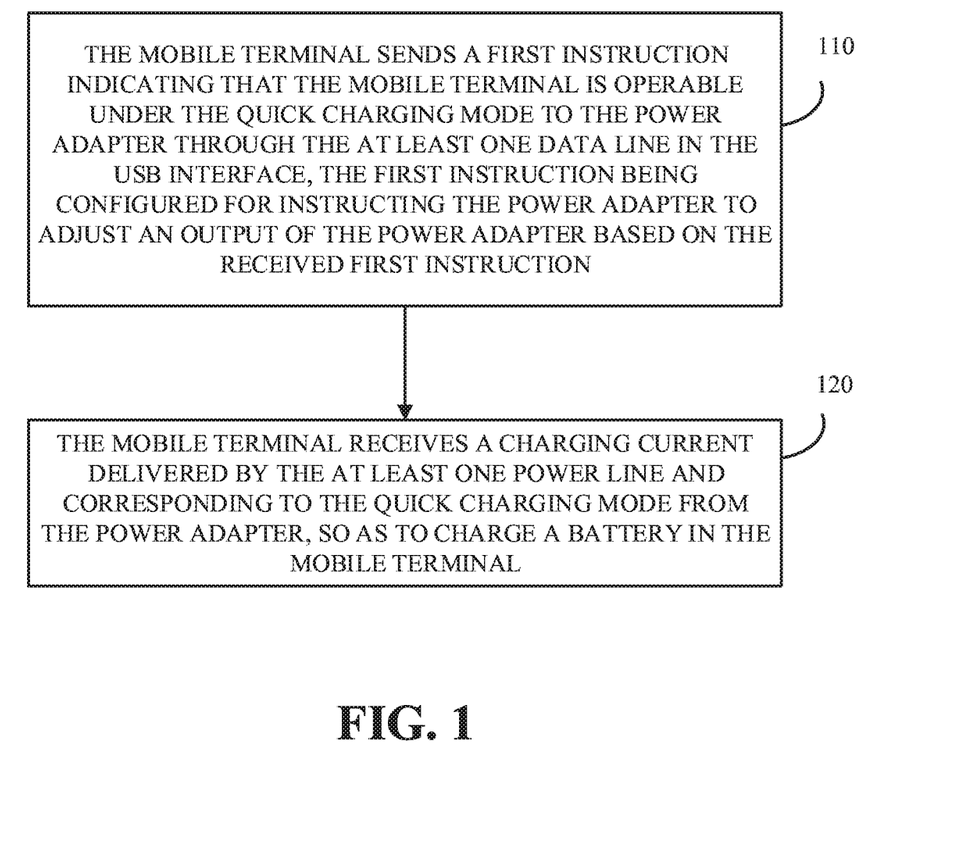
FIG. 1 is a schematic flowchart of a quick charging method according to an implementation of the present disclosure.

FIG. 1 is a schematic flowchart of a quick charging method according to an implementation of the present disclosure. The method as shown in FIG. 1 is executed by a mobile terminal which is configured for coupling with a power adapter via a Universal Serial Bus (USB) interface of the mobile terminal. The USB interface may be an ordinary USB interface, or may be a micro USB interface. At least one power line located in the USB interface is configured for delivering electrical power from the power adapter to the mobile terminal to charge the mobile terminal. The power line in the USB interface may be a VBus line and/or a ground line in the USB interface. At least one data line located in the USB interface is configured for establishing a bi-directional communication between the power adapter and the mobile terminal. The data line may be a D+ line and/or a D− line in the USB interface. The so-called bi-directional communication may refer to information exchange between the power adapter and the mobile terminal. The mobile terminal is selectively operable under a first charging mode (common charging mode) or a second charging mode (quick charging mode), and a charging current delivered by the at least one power line when the mobile terminal is operable under the quick charging mode is greater than a charging current delivered by the at least one power line when the mobile terminal is operable under the common charging mode. For example, the charging current under the common charging mode is generally less than 2.5 A, and the charging current under the quick charging mode may be greater than 3 A.

The method as shown in FIG. 1 comprises:

Step 110: the mobile terminal sends a first instruction indicating that the mobile terminal is operable under the quick charging mode to the power adapter through the at least one data line in the USB interface, the first instruction being configured for instructing the power adapter to adjust an output of the power adapter based on the received first instruction.

It should be understood that, before step 110, the mobile terminal may determine whether to be quickly charged, based on current power, current voltage of a battery, or operating state of the mobile terminal, or the like.

Step 120: the mobile terminal receives a charging current delivered by the at least one power line and corresponding to the quick charging mode from the power adapter, so as to charge a battery in the mobile terminal.

In the implementation of the present disclosure, instead of increasing an output current to quickly charge the mobile terminal, the power adapter quickly charges the mobile terminal under the quick charging mode after receiving the first instruction of the mobile terminal, thereby improving the security of the quick charging process.

In at least one implementation, before the mobile terminal receives the charging current delivered by the at least one power line and corresponding to the quick charging mode from the power adapter, so as to charge the battery in the mobile terminal, the method as shown in FIG. 1 may further comprise: sending, by the mobile terminal, a second instruction to the power adapter through the at least one data line in the USB interface, the second instruction being configured for indicating a charging voltage delivered by the at least one power line and corresponding to the quick charging mode from the power adapter.

It should be understood that, the charging voltage corresponding to the quick charging mode may be a preset charging voltage of the power adapter, or may be a charging voltage indicated through the second instruction by the mobile terminal. In at least one implementation, the mobile terminal may determine the charging voltage corresponding to the quick charging mode based on its operating parameters, such as battery power, voltage, and temperature and so on.

In at least one implementation, before the mobile terminal receives the charging current delivered by the at least one power line and corresponding to the quick charging mode from the power adapter, so as to charge the battery in the mobile terminal, the method may further comprise: sending, by the mobile terminal, a third instruction to the power adapter through the at least one data line in the USB interface, the third instruction being configured for indicating the charging current corresponding to the quick charging mode from the power adapter.

It should be understood that, the charging current corresponding to the quick charging mode may be a preset charging current of the power adapter, or may be a charging current indicated through the third instruction by the mobile terminal. In at least one implementation, the mobile terminal may determine the charging current corresponding to the quick charging mode based on its operating parameters, such as battery power, voltage, and temperature and so on.

In at least one implementation, the method as shown in FIG. 1 may further comprise: sending, by the mobile terminal, a fourth instruction to the power adapter through the at least one data line in the USB interface during a charging period when the mobile terminal is being charged by the charging current corresponding to the quick charging mode through the at least one power line, the fourth instruction being configured for indicating a current voltage of the battery in the mobile terminal such that the power adapter adjusts the charging current based on the current voltage of the battery, or determines whether there is a poor connection between the power adapter and the mobile terminal based on the charging voltage from the power adapter and the current voltage of the battery.

In at least one implementation, the power adapter may determine impedance of the circuit (e.g., the whole circuit) based on a voltage drop between its output voltage and battery voltage obtained, and determine that there is a poor connection between the power adapter and the mobile terminal when the impedance of the circuit is greater than a predetermined threshold.

In the above, in conjunction with FIG. 1, from the mobile terminal's perspective, a detailed description for the quick charging method according to the implementation of the present disclosure is provided. Moreover, in conjunction with FIG. 2, from the power adapter's perspective, a description for the quick charging method according to an implementation of the present disclosure is provided hereinafter.

It should be understood that, the interactions, relevant features, functions and so on of the power adapter and the mobile terminal described from the mobile terminal's perspective are corresponding to those described from the power adapter's perspective, and thus repeated description is omitted appropriately for simplicity.

Figure 2:
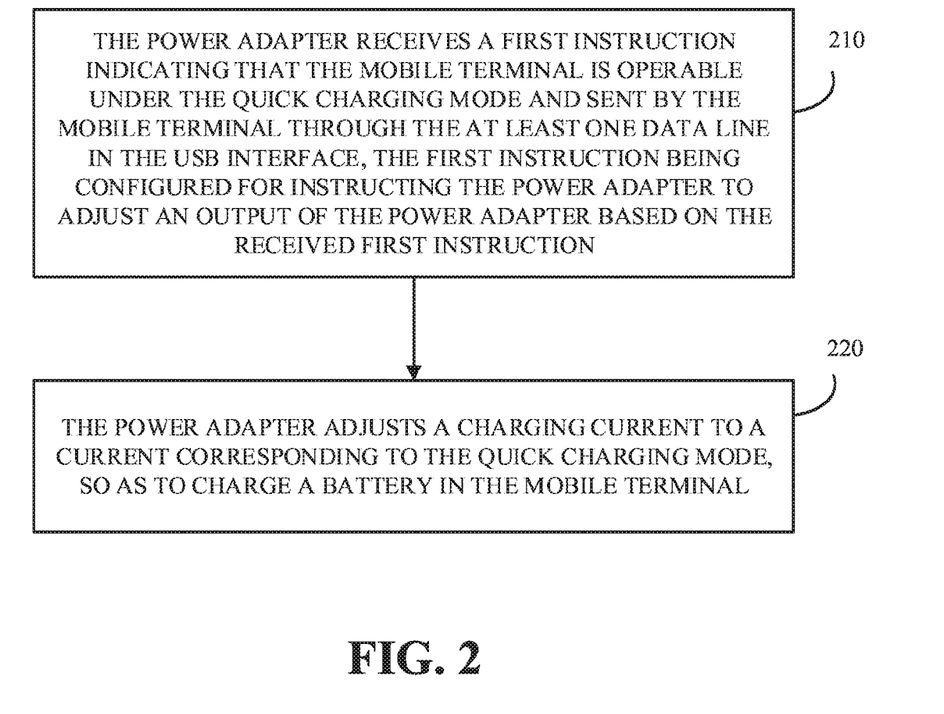
FIG. 2 is a schematic flowchart of a quick charging method according to an implementation of the present disclosure.

FIG. 2 is a schematic flowchart of a quick charging method according to an implementation of the present disclosure. The method as shown in FIG. 2 is executed by a power adapter which is configured for coupling with a mobile terminal via a USB interface of the mobile terminal. At least one power line located in the USB interface is configured for delivering electrical power from the power adapter to the mobile terminal to charge the mobile terminal, and at least one data line located in the USB interface is configured for establishing a bi-directional communication between the power adapter and the mobile terminal. The power adapter is selectively operable under a common charging mode or a quick charging mode, and a charging current delivered by the at least one power line when the mobile terminal is operable under the quick charging mode is greater than a charging current delivered by the at least one power line when the mobile terminal is operable under the common charging mode. The method as shown in FIG. 2 comprises:

Step 210: the power adapter receives a first instruction indicating that the mobile terminal is operable under the quick charging mode and sent by the mobile terminal through the at least one data line in the USB interface, the first instruction being configured for instructing the power adapter to adjust an output of the power adapter based on the received first instruction.

Step 220: the power adapter adjusts a charging current to a current corresponding to the quick charging mode, so as to charge a battery in the mobile terminal.

In the implementation of the present disclosure, instead of increasing an output current to quickly charge the mobile terminal, the power adapter quickly charges the mobile under the quick charging mode after receiving the first instruction of the mobile terminal, thereby improving the security of the quick charging process.

In at least one implementation, before the power adapter adjusts the charging current to the current corresponding to the quick charging mode, so as to charge a battery in the mobile terminal, the method as shown in FIG. 2 may further comprise: receiving, by the power adapter, a second instruction sent by the mobile terminal through the at least one data line in the USB interface, the second instruction being configured for indicating a charging voltage corresponding to the quick charging mode.

In at least one implementation, before the power adapter adjusts the charging current to the current corresponding to the quick charging mode, so as to charge a battery in the mobile terminal, the method as shown in FIG. 2 may further comprise: receiving, by the power adapter, a third instruction sent by the mobile terminal through the at least one data line in the USB interface, the third instruction being configured for indicating the charging current corresponding to the quick charging mode.

In at least one implementation, the method as shown in FIG. 2 may further comprise: receiving, by the power adapter, a fourth instruction sent by the mobile terminal through the at least one data line in the USB interface during a charging period when the mobile terminal is being charged by the charging current corresponding to the quick charging mode through the at least one power line, the fourth instruction being configured for indicating a current voltage of the battery in the mobile terminal; and adjusting, by the power adapter, the charging current based on the current voltage of the battery in the mobile terminal.

In at least one implementation, adjusting, by the power adapter, the charging current based on the current voltage of the battery in the mobile terminal may comprise: adjusting, by the power adapter, the charging current of the power adapter to the charging current corresponding to the current voltage of the battery, based on the current voltage of the battery, and the preset correspondence between the battery voltage and the charging current.

In at least one implementation, the method as shown in FIG. 2 may further comprise: receiving, by the power adapter, a fourth instruction sent by the mobile terminal through the at least one data line in the USB interface during a charging period when the mobile terminal is being charged by the charging current corresponding to the quick charging mode through the at least one power line, the fourth instruction being configured for indicating a current voltage of the battery in the mobile terminal; and determining, by the power adapter, whether there is a poor connection between the power adapter and the mobile terminal based on the charging voltage from the power adapter and the current voltage of the battery.

In the above, in conjunction with FIG. 1 and FIG. 2, a detailed description for the quick charging method according to the implementation of the present disclosure is provided. Moreover, in conjunction with FIG. 3 and FIG. 4, a detailed description for a mobile terminal and a power adapter according to an implementation of the present disclosure is provided hereinafter. It should be understood that, the mobile terminal as shown in FIG. 3 may realize each of the steps as shown in FIG. 1 to FIG. 2 performed by a mobile terminal, and the power adapter as shown in FIG. 4 may realize each of the steps as shown in FIG. 1 to FIG. 2 performed by a power adapter, which is not described in detail to avoid repetition.

Figure 3:
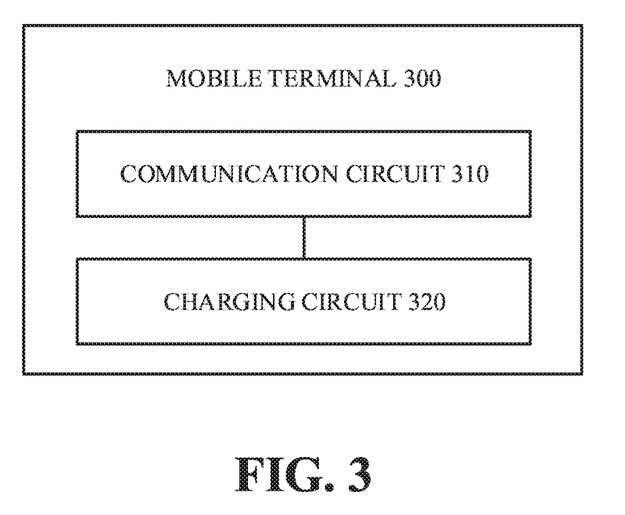
FIG. 3 is a schematic block diagram of a mobile terminal according to an implementation of the present disclosure.
Figure 4:
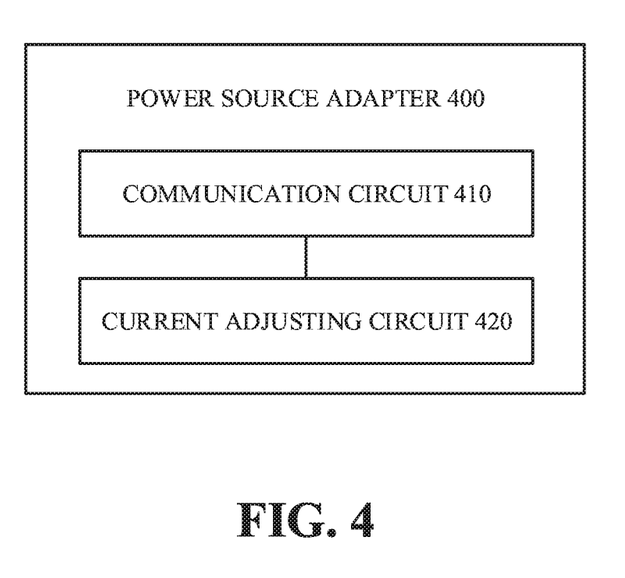
FIG. 4 is a schematic block diagram of a power adapter according to an implementation of the present disclosure.

FIG. 3 is a schematic block diagram of a mobile terminal according to an implementation of the present disclosure. A mobile terminal 300 as shown in FIG. 3 is configured for coupling with a power adapter via a USB interface of the mobile terminal. At least one power line located in the USB interface is configured for delivering electrical power from the power adapter to the mobile terminal to charge the mobile terminal. At least one data line located in the USB interface is configured for establishing a bi-directional communication between the power adapter and the mobile terminal 300. The mobile terminal 300 is selectively operable under a common charging mode or a quick charging mode, and a charging current delivered by the at least one power line when the mobile terminal is operable under the quick charging mode is greater than a charging current delivered by the at least one power line when the mobile terminal is operable under the common charging mode.

The mobile terminal 300 comprises:

A communication circuit 310 configured for sending a first instruction indicating that the mobile terminal is operable under the quick charging mode to the power adapter through the at least one data line in the USB interface, the first instruction being configured for instructing the power adapter to adjust an output of the power adapter based on the received first instruction; and A charging circuit 320 configured for receiving a charging current delivered by the at least one power line and corresponding to the quick charging mode from the power adapter, so as to charge a battery in the mobile terminal 300.

In the implementation of the present disclosure, instead of increasing an output current to quickly charge the mobile terminal, the power adapter quickly charges the mobile terminal under the quick charging mode after receiving the first instruction of the mobile terminal, thereby improving the security of the quick charging process.

In at least one implementation, the communication circuit 310 is further configured for sending a second instruction to the power adapter through the at least one data line in the USB interface, the second instruction being configured for indicating a charging voltage delivered by the at least one power line and corresponding to the quick charging mode from the power adapter.

In at least one implementation, the communication circuit 310 is further configured for sending a third instruction to the power adapter through the at least one data line in the USB interface, the third instruction being configured for indicating the charging current corresponding to the quick charging mode from the power adapter.

In at least one implementation, the communication circuit 310 is further configured for sending a fourth instruction to the power adapter through the at least one data line in the USB interface during a charging period when the mobile terminal 300 is being charged by the charging current corresponding to the quick charging mode through the at least one power line, the fourth instruction being configured for indicating a current voltage of the battery in the mobile terminal 300 such that the power adapter adjusts the charging current based on the current voltage of the battery, or determines whether there is a poor connection between the power adapter and the mobile terminal based on the charging voltage from the power adapter and the current voltage of the battery.

FIG. 4 is a schematic diagram of a power adapter according to an implementation of the present disclosure. The power adapter 400 as shown in FIG. 4 is configured for coupling with a mobile terminal via a USB interface of the mobile terminal. At least one power line located in the USB interface is configured for delivering electrical power from the power adapter 400 to the mobile terminal to charge the mobile terminal, and at least one data line located in the USB interface is configured for establishing a bi-directional communication between the power adapter 400 and the mobile terminal. The power adapter 400 is selectively operable under a common charging mode or a quick charging mode, and a charging current delivered by the at least one power line when the mobile terminal is operable under the quick charging mode is greater than a charging current delivered by the at least one power line when the mobile terminal is operable under the common charging mode.

The power adapter 400 comprises:

A communication circuit 410 configured for receiving a first instruction indicating that the mobile terminal is operable under the quick charging mode and sent by the mobile terminal through the at least one data line in the USB interface, the first instruction being configured for instructing the power adapter 400 to adjust an output of the power adapter based on the received first instruction; and A current adjusting circuit 420 configured for adjusting a charging current to a current corresponding to the quick charging mode, so as to charge a battery in the mobile terminal.

In the implementation of the present disclosure, instead of increasing an output current to quickly charge the mobile terminal, the power adapter quickly charges the mobile terminal under the quick charging mode after receiving the first instruction of the mobile terminal, thereby improving the security of the quick charging process.

In at least one implementation, the communication circuit 410 is further configured for receiving a second instruction sent by the mobile terminal through the at least one data line in the USB interface, the second instruction being configured for indicating a charging voltage corresponding to the quick charging mode.

In at least one implementation, the communication circuit 410 is further configured for receiving a third instruction sent by the mobile terminal through the at least one data line in the USB interface, the third instruction being configured for indicating the charging current corresponding to the quick charging mode.

In at least one implementation, the communication circuit 410 is further configured for receiving a fourth instruction sent by the mobile terminal through the at least one data line in the USB interface during a charging period when the mobile terminal is being charged by the charging current corresponding to the quick charging mode through the at least one power line, the fourth instruction being configured for indicating a current voltage of the battery in the mobile terminal; the current adjusting circuit 420 is configured for adjusting the charging current based on the current voltage of the battery in the mobile terminal.

In at least one implementation, the current adjusting circuit 420 is configured for adjusting the charging current of the power adapter 400 to the charging current corresponding to the current voltage of the battery, based on the current voltage of the battery, and the preset correspondence between the battery voltage and the charging current.

In at least one implementation, the communication circuit 410 is further configured for receiving a fourth instruction sent by the mobile terminal through the at least one data line in the USB interface during a charging period when the mobile terminal is being charged by the charging current corresponding to the quick charging mode through the at least one power line, the fourth instruction being configured for indicating a current voltage of the battery in the mobile terminal; the power adapter 400 determines whether there is a poor connection between the power adapter and the mobile terminal based on the charging voltage from the power adapter 400 and the current voltage of the battery.

Persons skilled in the art should appreciate that units and programming steps of various examples described in the implementations of the present disclosure can be realized by electronic hardware or a combination of computer software and electronic hardware. Whether these functions are realized by hardware or software depends on particular applications and design constraint conditions of technical solutions. For each particular application, persons skilled in the art can employ different methods to realize described functions, but this realization should fall into the scope of the present disclosure.

Persons skilled in the art can clearly understand that specific operating processes of the above described systems, devices, and units may be understood by referring to the corresponding processes of the above process implementations which will not be repeated herein for convenience and simplicity.

In several implementations provided by the present disclosure, it should be understood that the disclosed systems, devices, and methods can be implemented in other ways. The apparatus implementations described above are only illustrative. For example, a division into the units is only a division based on logic functions, and may be a division in other ways when actually implementing. For example, several units or assemblies may be combined or may be integrated into another system, or some features may be ignored, or not executed. On the other hand, mutual coupling or direct coupling or communication connection illustrated or discussed herein may be indirect coupling or communication connection through certain interfaces, devices, or units, and may be in a form of electricity, machine, or the like.

The units described as separate units may be or may not be physically separated, and components shown as units may be or may not be physical units, that is to say, may be in one place, or may be distributed in several network units. A part or all of the units may be selected according to actual requirements to achieve the purpose of the solution of the present implementations.

Additionally, various functional units in the implementations of the present disclosure may be integrated into one processing unit, or various functional units each may exist physically separately or two or more units may be integrated into one unit.

If the functions are realized in a form of functional software units and may be sold or used as stand-alone products, they may be stored in a computer-readable storage medium. Based on such understanding, the spirit of the technical solution of the present disclosure, or a part of the technical solution that contributes to related art or a certain part of the technical solution may be embodied in a form of software product. The computer software product may be stored in a storage medium, and comprise a plurality of instructions configured to instruct a computer device (personal computer, server, or network device) to execute all or a part of steps of various implementations of the present disclosure. The storage medium described above comprises various medium storing program codes, such as a U-disk, a mobile hard disk, a read-only memory (ROM), a random access memory (RAM), a disc, a compact disc and so on.

The foregoing descriptions are merely preferred implementations of the present disclosure, rather than limiting the protection scope of the present disclosure. Any person skilled in the art could readily conceive modifications or substitutions within the technical scope of the present disclosure, and these modifications or substitutions should fall within the protection scope of the present disclosure. Therefore, the protection scope of the present disclosure should be limited by the protection scope of the claims.

What is claimed is:

1. A method of quick charging for a mobile terminal configured for coupling with a power adapter via a Universal Serial Bus (USB) interface of the mobile terminal, comprising:

sending, by the mobile terminal, a first instruction indicating that the mobile terminal is operable under a second charging mode to the power adapter through at least one data line in the USB interface, wherein the first instruction is configured for instructing the power adapter to adjust an output of the power adapter to an output corresponding to the second charging mode, at least one power line located in the USB interface is configured for delivering electrical power from the power adapter to the mobile terminal to charge the mobile terminal, the at least one data line located in the USB interface is configured for establishing a bi-directional communication between the power adapter and the mobile terminal, the mobile terminal is selectively operable under a first charging mode or the second charging mode, and a charging current delivered by the at least one power line when the mobile terminal is operable under the second charging mode is greater than a charging current delivered by the at least one power line when the mobile terminal is operable under the first charging mode;

receiving, by the mobile terminal, a charging current delivered by the at least one power line and corresponding to the second charging mode from the power adapter to charge a battery in the mobile terminal; and sending, by the mobile terminal, a fourth instruction to the power adapter through the at least one data line in the USB interface during a charging period when the mobile terminal is being charged by the charging current corresponding to the second charging mode through the at least one power line, the fourth instruction being configured for indicating a current voltage of the battery in the mobile terminal such that the power adapter adjusts the charging current based on the current voltage of the battery, or determines whether there is a poor connection between the power adapter and the mobile terminal based on a charging voltage from the power adapter and the current voltage of the battery.

2. The method of claim 1, wherein before receiving, by the mobile terminal, the charging current delivered by the at least one power line and corresponding to the second charging mode from the power adapter, so as to charge the battery in the mobile terminal, the method further comprising:

sending, by the mobile terminal, a second instruction to the power adapter through the at least one data line in the USB interface, the second instruction being configured for indicating a charging voltage delivered by the at least one power line and corresponding to the second charging mode from the power adapter.

3. The method of claim 1, wherein before receiving, by the mobile terminal, the charging current delivered by the at least one power line and corresponding to the second charging mode from the power adapter, so as to charge the battery in the mobile terminal, the method further comprising:

sending, by the mobile terminal, a third instruction to the power adapter through the at least one data line in the USB interface, the third instruction being configured for indicating the charging current corresponding to the second charging mode from the power adapter.

4. A method of quick charging for a power adapter configured for coupling with a mobile terminal via a Universal Serial Bus (USB) interface of the mobile terminal, comprising:
receiving, by the power adapter, a first instruction indicating that the mobile terminal is operable under a second charging mode and sent by the mobile terminal through at least one data line in the USB interface, wherein the first instruction is configured for instructing the power adapter to adjust an output of the power adapter to an output corresponding to the second charging mode, at least one power line located in the USB interface is configured for delivering electrical power from the power adapter to the mobile terminal to charge the mobile terminal, the at least one data line located in the USB interface is configured for establishing a bi-directional communication between the power adapter and the mobile terminal, the power adapter is selectively operable under a first charging mode or the second charging mode, and a charging current delivered by the at least one power line when the power adapter is operable under the second charging mode is greater than a charging current delivered by the at least one power line when the power adapter is operable under the first charging mode;
adjusting, by the power adapter, a charging current to a current corresponding to the second charging mode to charge a battery in the mobile terminal;
receiving, by the power adapter, a fourth instruction sent by the mobile terminal through the at least one data line in the USB interface during a charging period when the mobile terminal is being charged by the charging current corresponding to the second charging mode through the at least one power line, the fourth instruction being configured for indicating a current voltage of the battery in the mobile terminal; and
determining, by the power adapter, whether there is a poor connection between the power adapter and the mobile terminal based on a charging voltage from the power adapter and the current voltage of the battery.

5. The method of claim 4, wherein before adjusting, by the power adapter, the charging current to the current corresponding to the second charging mode, so as to charge a battery in the mobile terminal, the method further comprising:
receiving, by the power adapter, a second instruction sent by the mobile terminal through the at least one data line in the USB interface, the second instruction being configured for indicating a charging voltage corresponding to the second charging mode.

6. The method of claim 4, wherein before adjusting, by the power adapter, the charging current to the current corresponding to the second charging mode, so as to charge a battery in the mobile terminal, the method further comprising:
receiving, by the power adapter, a third instruction sent by the mobile terminal through the at least one data line in the USB interface, the third instruction being configured for indicating the charging current corresponding to the second charging mode.

7. The method of claim 4, further comprising:
receiving, by the power adapter, a fourth instruction sent by the mobile terminal through the at least one data line in the USB interface during a charging period when the mobile terminal is being charged by the charging current corresponding to the second charging mode through the at least one power line, the fourth instruction being configured for indicating a current voltage of the battery in the mobile terminal; and
adjusting, by the power adapter, the charging current based on the current voltage of the battery in the mobile terminal.

8. The method of claim 7, wherein adjusting the charging current based on the current voltage of the battery in the mobile terminal comprises:
adjusting, by the power adapter, the charging current of the power adapter to the charging current corresponding to the current voltage of the battery, based on the current voltage of the battery, and a corresponding relationship between the current voltage of the battery and the charging current.

9. A mobile terminal, configured for coupling with a power adapter via a Universal Serial Bus (USB) interface of the mobile terminal, comprising:
a communication unit configured for sending a first instruction indicating that the mobile terminal is operable under a second charging mode to the power adapter through at least one data line in the USB interface, wherein the first instruction is configured for instructing the power adapter to adjust an output of the power adapter to an output corresponding to the second charging mode, at least one power line located in the USB interface is configured for delivering electrical power from the power adapter to the mobile terminal to charge the mobile terminal, the at least one data line located in the USB interface is configured for establishing a bi-directional communication between the power adapter and the mobile terminal, the mobile terminal is selectively operable under a first charging mode or the second charging mode, and a charging current delivered by the at least one power line when the mobile terminal is operable under the second charging mode is greater than a charging current delivered by the at least one power line when the mobile terminal is operable under the first charging mode; and
a charging unit configured for receiving a charging current delivered by the at least one power line and corresponding to the second charging mode from the power adapter to charge a battery in the mobile terminal; and wherein
the communication unit is further configured for sending a fourth instruction to the power adapter through the at least one data line in the USB interface during a charging period when the mobile terminal is being charged by the charging current corresponding to the second charging mode through the at least one power line, the fourth instruction being configured for indicating a current voltage of the battery in the mobile terminal such that the power adapter adjusts the charging current based on the current voltage of the battery, or determines whether there is a poor connection between the power adapter and the mobile terminal based on a charging voltage from the power adapter and the current voltage of the battery.

10. The mobile terminal of claim 9, wherein the communication unit is further configured for sending a second instruction to the power adapter through the at least one data line in the USB interface, the second instruction being configured for indicating a charging voltage delivered by the at least one power line and corresponding to the second charging mode from the power adapter.

11. The mobile terminal of claim 9, wherein the communication unit is further configured for sending a third instruction to the power adapter through the at least one data line in the USB interface, the third instruction being configured for indicating the charging current corresponding to the second charging mode from the power adapter.

12. A power adapter, configured for coupling with a mobile terminal via a Universal Serial Bus (USB) interface of the mobile terminal, comprising:
    a communication unit configured for receiving a first instruction indicating that the mobile terminal is operable under a second charging mode and sent by the mobile terminal through at least one data line in the USB interface, wherein the first instruction is configured for instructing the power adapter to adjust an output of the power adapter to an output corresponding to the second charging mode, at least one power line located in the USB interface is configured for delivering electrical power from the power adapter to the mobile terminal to charge the mobile terminal, the at least one data line located in the USB interface is configured for establishing a bi-directional communication between the power adapter and the mobile terminal, the power adapter is selectively operable under a first charging mode or the second charging mode, and a charging current delivered by the at least one power line when the power adapter is operable under the second charging mode is greater than a charging current delivered by the at least one power line when the power adapter is operable under the first charging mode; and
    a current adjusting unit configured for adjusting a charging current to a current corresponding to the second charging mode to charge a battery in the mobile terminal; and wherein the communication unit is further configured for receiving a fourth instruction sent by the mobile terminal through the at least one data line in the USB interface during a charging period when the mobile terminal is being charged by the charging current corresponding to the second charging mode through the at least one power line, the fourth instruction being configured for indicating a current voltage of the battery in the mobile terminal;
    the power adapter determines whether there is a poor connection between the power adapter and the mobile terminal based on a charging voltage from the power adapter and the current voltage of the battery.

13. The power adapter of claim 12, wherein the communication unit is further configured for receiving a second instruction sent by the mobile terminal through the at least one data line in the USB interface, the second instruction being configured for indicating a charging voltage corresponding to the second charging mode.

14. The power adapter of claim 12, wherein the communication unit is further configured for receiving a third instruction sent by the mobile terminal through the at least one data line in the USB interface, the third instruction being configured for indicating the charging current corresponding to the second charging mode.

15. The power adapter of claim 12, wherein
    the current adjusting unit is configured for adjusting the charging current based on the current voltage of the battery in the mobile terminal.

16. The power adapter of claim 15, wherein the current adjusting unit is configured for adjusting the charging current of the power adapter to the charging current corresponding to the current voltage of the battery, based on the current voltage of the battery, and a corresponding relationship between the current voltage of the battery and the charging current.

* * * * *